US011178359B2

(12) United States Patent
Graham et al.

(10) Patent No.: US 11,178,359 B2
(45) Date of Patent: Nov. 16, 2021

(54) ELECTRONIC DEVICE AND GENERATING CONFERENCE CALL PARTICIPANTS IDENTIFICATIONS

(71) Applicant: Hewlett-Packard Development Company, L.P., Spring, TX (US)

(72) Inventors: Christoph Graham, Spring, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/651,292

(22) PCT Filed: Sep. 26, 2017

(86) PCT No.: PCT/US2017/053511
§ 371 (c)(1),
(2) Date: Mar. 26, 2020

(87) PCT Pub. No.: WO2019/066782
PCT Pub. Date: Apr. 4, 2019

(65) Prior Publication Data
US 2020/0275058 A1    Aug. 27, 2020

(51) Int. Cl.
*H04N 7/15* (2006.01)
*H04L 12/18* (2006.01)
(Continued)

(52) U.S. Cl.
CPC ......... *H04N 7/157* (2013.01); *H04L 12/1822* (2013.01); *H04L 12/1831* (2013.01);
(Continued)

(58) Field of Classification Search
CPC ............. H04L 12/1822; H04L 12/1831; H04L 67/306; H04M 3/567; H04M 3/568; H04N 7/157
See application file for complete search history.

(56) References Cited

U.S. PATENT DOCUMENTS 5,491,743 A * 2/1996 Shiio ..................... H04M 3/568
709/204
5,889,843 A * 3/1999 Singer ..................... H04M 3/56
379/202.01
(Continued)

FOREIGN PATENT DOCUMENTS

CN           1678004 A     10/2005
CN       102355646 A      2/2012
(Continued)

OTHER PUBLICATIONS

Carlos Busso et al. "Smart Room: Participant and Speaker Localization and Identification", ICASSP 2005, II-1117-1020, 4 pages. (Year: 2005).*

(Continued)

*Primary Examiner* — George C Neurauter, Jr.
(74) *Attorney, Agent, or Firm* — Rahman LLC

(57) ABSTRACT

An example electronic device for conducting conference calls includes a memory to store a user profile including first identifying information of a first participant in a conference call. A receiver receives second identifying information of the first participant from a transmitting device associated with the first participant. The first identifying information and the second identifying information form an identifier for the first participant. An audio encoder receives an audio signal. A processor, in response to determining which transmitting device is nearest to a source of the audio signal relative to other transmitting devices, identifies the first participant as a source of the audio signal, and combines the identifier for the first participant with the audio signal generated by the first participant. A router forwards the combined identifier and audio of the first participant to a receiving device of a second participant in the conference call.

20 Claims, 8 Drawing Sheets

(51) Int. Cl.
*H04M 3/56* (2006.01)
*H04L 29/08* (2006.01)

(52) U.S. Cl.
CPC .......... *H04L 67/306* (2013.01); *H04M 3/567* (2013.01); *H04M 3/568* (2013.01)

(56) References Cited

U.S. PATENT DOCUMENTS

| | | | |
|---|---|---|---|
| 6,457,043 B1* | 9/2002 | Kwak | H04L 12/1822 |
| | | | 709/202 |
| 6,559,863 B1* | 5/2003 | Megiddo | H04L 12/1827 |
| | | | 348/14.08 |
| 6,628,767 B1 | 9/2003 | Wellner et al. | |
| 7,107,312 B2* | 9/2006 | Hackbarth | G06Q 10/107 |
| | | | 709/204 |
| 7,346,654 B1* | 3/2008 | Weiss | H04N 7/15 |
| | | | 348/E7.083 |
| 7,920,158 B1 | 4/2011 | Alexander et al. | |
| 8,515,025 B1* | 8/2013 | Hewinson | H04M 3/56 |
| | | | 379/88.02 |
| 8,515,091 B2* | 8/2013 | Pallone | H04L 65/80 |
| | | | 381/74 |
| 8,781,841 B1 | 7/2014 | Wang et al. | |
| 9,014,679 B2* | 4/2015 | Lobzakov | H04M 1/72566 |
| | | | 455/416 |
| 9,106,717 B2* | 8/2015 | Nicholson | H04L 65/1083 |
| 9,185,524 B2* | 11/2015 | Chambers | H04W 4/025 |
| 9,191,616 B2* | 11/2015 | Krantz | H04N 7/147 |
| 9,569,431 B2 | 2/2017 | Uszkoreit et al. | |
| 9,699,409 B1 | 7/2017 | Reshef et al. | |
| 10,637,898 B2* | 4/2020 | Cohen | G10L 17/04 |
| 10,839,807 B2* | 11/2020 | Degraye | G10L 15/22 |
| 2007/0167136 A1* | 7/2007 | Groth | H04W 8/005 |
| | | | 455/41.2 |
| 2009/0089055 A1 | 4/2009 | Caspi et al. | |
| 2009/0300525 A1* | 12/2009 | Jolliff | H04L 67/306 |
| | | | 715/764 |
| 2011/0271212 A1 | 11/2011 | Jones et al. | |
| 2014/0169543 A1 | 6/2014 | Goguen et al. | |
| 2016/0142462 A1 | 5/2016 | Johnston et al. | |
| 2017/0070706 A1* | 3/2017 | Ursin | H04L 12/1822 |
| 2017/0272393 A1* | 9/2017 | Nimushakavi | H04L 12/1822 |

FOREIGN PATENT DOCUMENTS

| | | | | |
|---|---|---|---|---|
| CN | 104112449 A | | 10/2014 | |
| CN | 104170358 A | * | 11/2014 | ......... G06F 3/04842 |
| JP | 2014165565 A | | 9/2014 | |

OTHER PUBLICATIONS

An Introduction to the Basics of Video Conferencing, http://www.polycom.co.in/content/dam/polycom/common/documents/whitepapers/intro-video-conferencing-wp-enab.pdf.

Selecting the Layout Seen by Participants, https://docs.pexip.com/admin/changing_layout.htm.

* cited by examiner

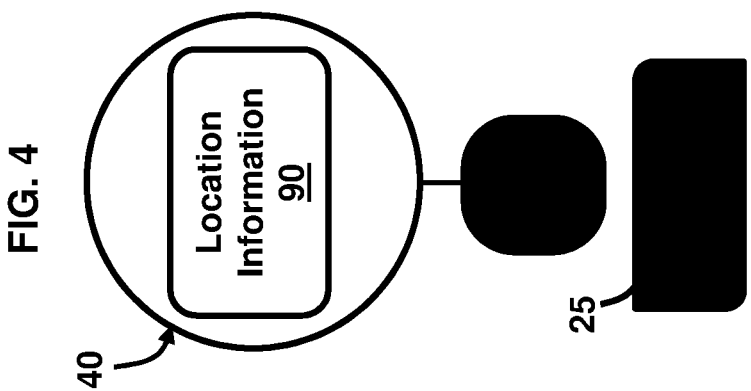
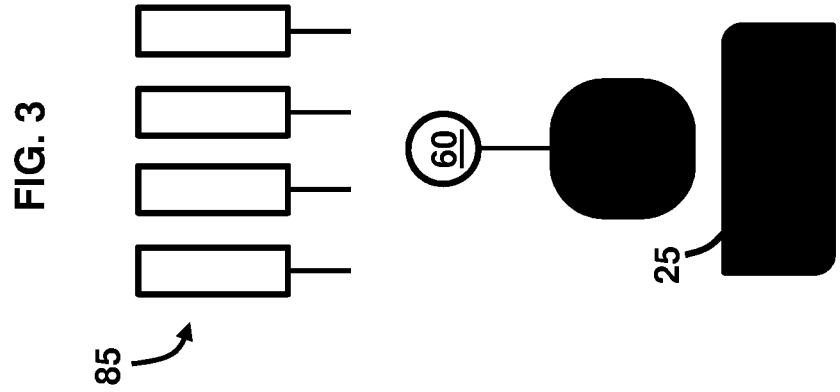
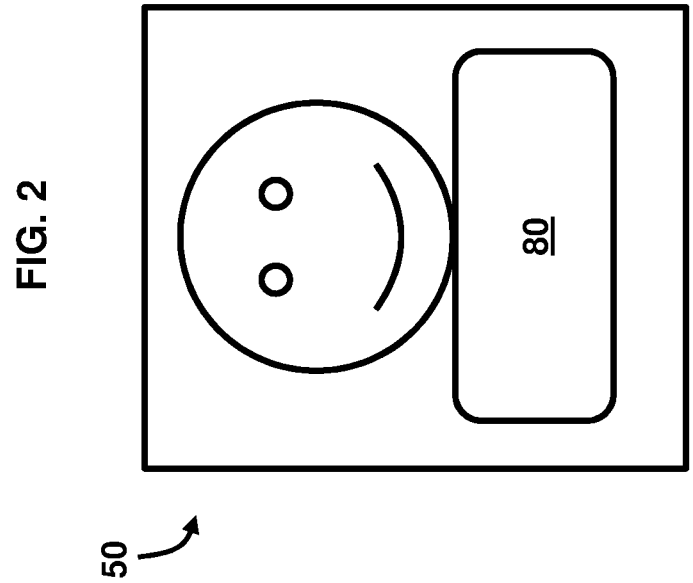

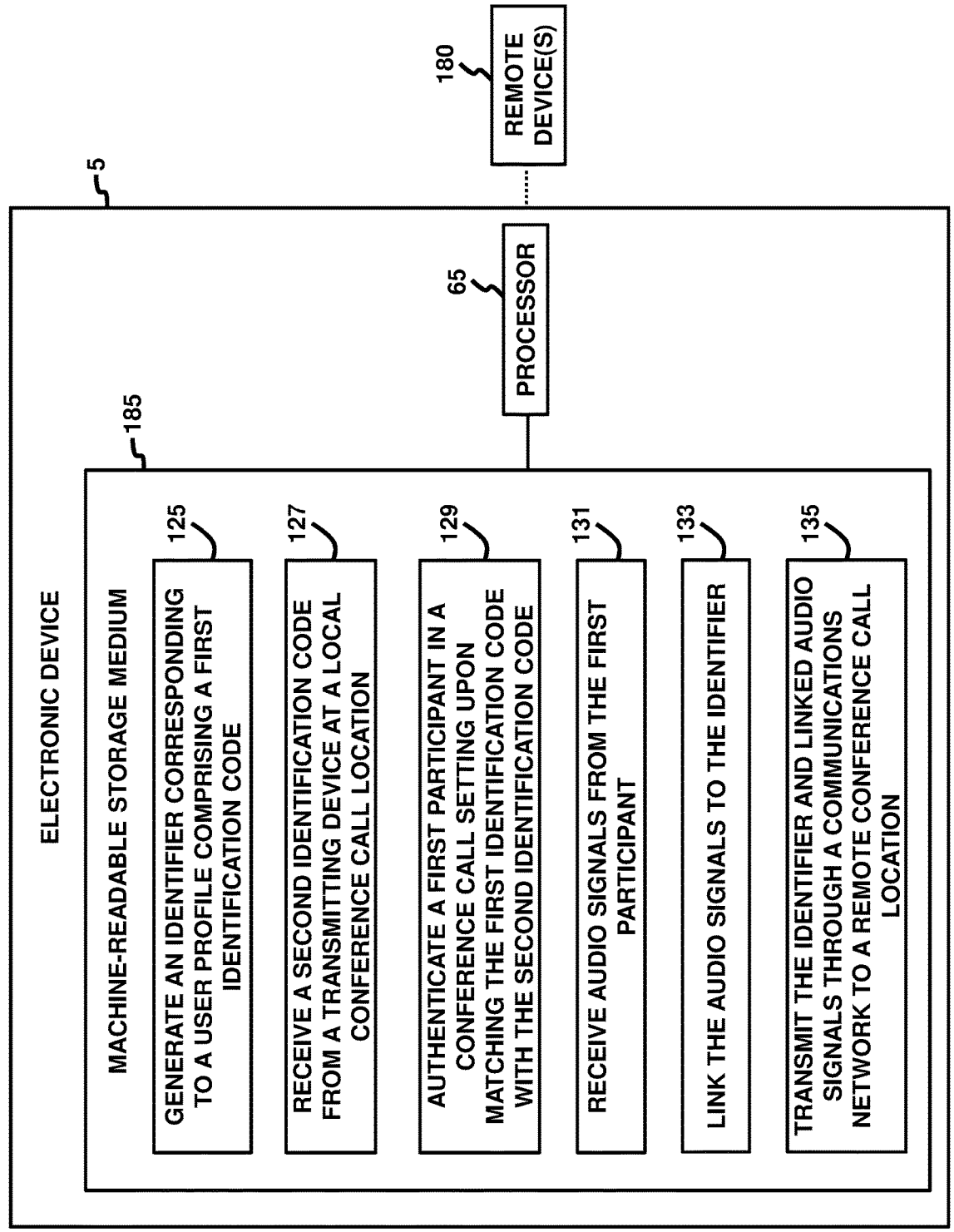

ELECTRONIC DEVICE AND GENERATING CONFERENCE CALL PARTICIPANTS IDENTIFICATIONS

BACKGROUND

Conference call hubs may originate from a physical conference room and virtual participants may be linked through networking connections. In-room participants typically share a common speaker phone or port for communicating with virtual participants.

BRIEF DESCRIPTION OF THE DRAWINGS

FIG. 2 is a schematic diagram illustrating an avatar assigned to a conference call participant according to an example.

FIG. 3 is a schematic diagram illustrating at least one directional microphone receiving an audio signal according to an example.

FIG. 4 is a schematic diagram illustrating identifying information relating to a conference call participant according to an example.

FIG. 9A is a block diagram of an electronic device for conducting a conference call according to an example.

DETAILED DESCRIPTION

Conference calls often involve multiple participants located in multiple locations. The local participants may be in a physical conference room where they enjoy the ability to clearly see and hear who within the conference room is speaking. Typically, there is a speaker phone set up in the conference room where the local participants can speak into and receive audio feedback from remote or virtual participants. When multiple local participants are gathered in a conference room for a call and are sharing one speaker phone, then there typically is no identifier of an individual when he/she speaks other than having the individual state his/her name prior to speaking, and each time he/she speaks. The remote participants who may be linked to the conference call through their computers or smart phones may only be able to identify local participants when the local participants speak and upon first stating his/her name or if the remote participant is able to recognize the voice of the local participant. With multiple participants involved in conference calls and with the possibility of new conference call attendees joining a call over time, it may be difficult to continuously keep the remote participants apprised of who is speaking at any given time in the local/physical conference call room.

Figure 1:
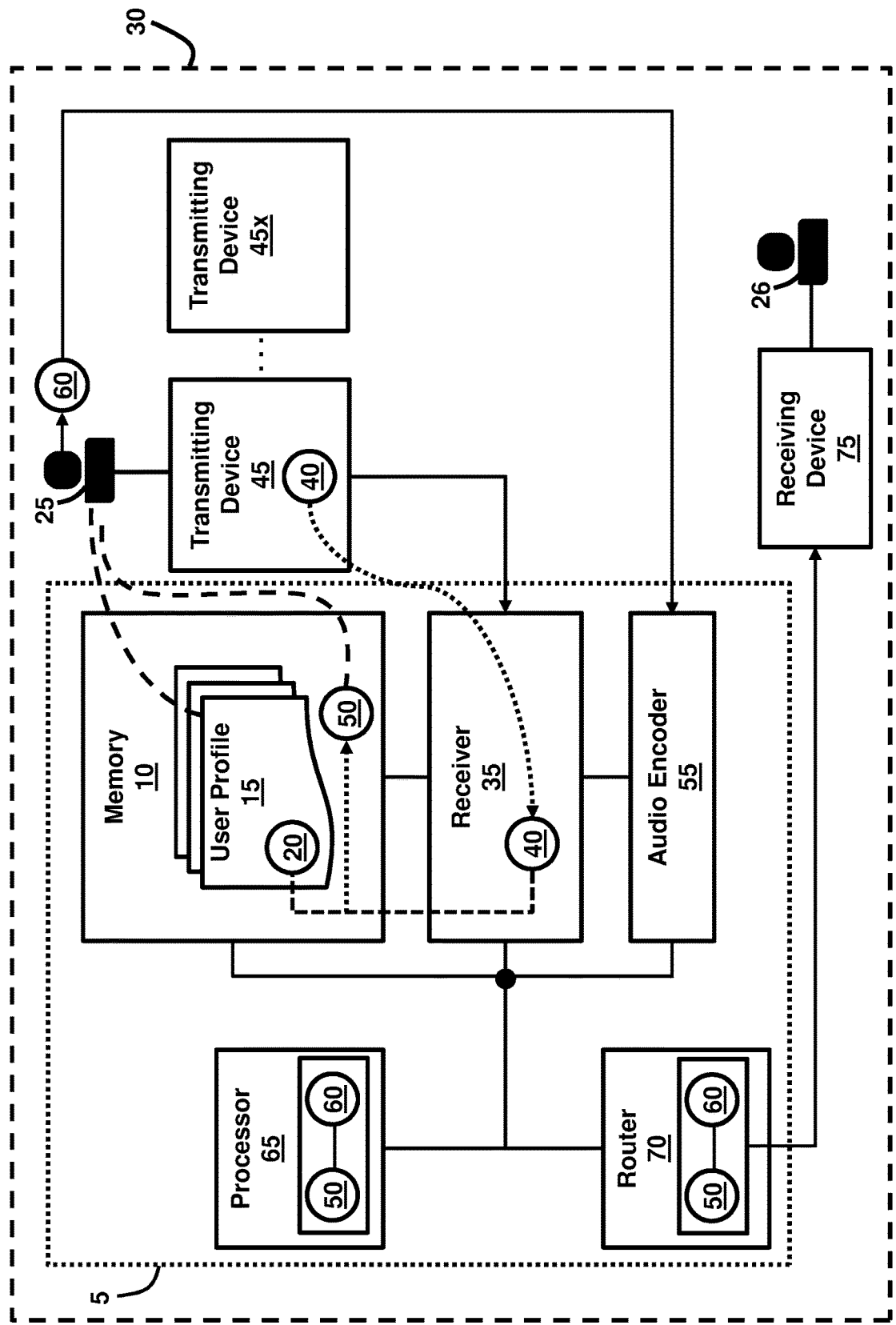
FIG. 1 is a schematic diagram depicting a conference call according to an example.

FIG. 1 is a schematic diagram depicting a conference call 30 according to an example. The conference call 30 represents the interaction between various participants 25, 26 who may be located in different places. For example, participant 25 may be a local participant and participant 26 may be a remote or virtual participant in the conference call 30. Moreover, the conference call 30 may utilize online conference call platforms such as the Skype® system, GoToMeeting® system, and WebEx® systems, among others for linking the various participants 25, 26 in the conference call 30. In FIG. 1, an electronic device 5 is shown comprising a memory 10 to store a user profile 15 comprising first identifying information 20 of a first participant 25 in a conference call 30. The electronic device 5 may be a single device with multiple components or it may be part of a system of sub-devices electronically linked together, according to various examples. The memory 10 may be Random Access Memory, Read-Only Memory, a cache memory, or other type of storage mechanism, according to an example. The user profile 15 may be pre-loaded based on data entered by one or more of the participants 25, 26 or entered on their behalf. The user profile 15 may include personal information about the participants 25, 26 including text, codes, pictures, and other types of media. The user profile 15 may be updated as needed. In an example, the first identifying information 20 of the first participant 25 may include the name, title, work location, work group, contact details, identification number, and picture of the first participant 25, among other types of information that creates a profile 15 of the first participant 25. The user profile 15 may also include a unique code associated with the first participant 25, which could be a company-assigned employee number, for example. In another example, each employee of a particular organization may be assigned a user profile 15 with that employee's unique identifying information 20, which is saved in the memory 10.

The electronic device 5 includes a receiver 35 to receive second identifying information 40 of the first participant 25 from a transmitting device 45 associated with the first participant 25, wherein the first identifying information 20 and the second identifying information 40 form an identifier 50 for the first participant 25. The receiver 35 and transmitting device 45 may utilize Bluetooth® telecommunication equipment or near field communication to facilitate the receiving and transmitting of wireless signals, respectively, in an example. Alternatively, the receiver 35 may utilize other communication protocols that permit the reception of electronic signals from other devices. In the context of the conference call 30, the first participant 25 may have a transmitting device 45 that he/she brings into a physical conference room where the conference call 30 is being locally held. In an example, the transmitting device 45 may comprise an electronic token or transponder that the first participant 25 carries with him/her. In another example, the transmitting device 45 may comprise a smart phone, tablet device, laptop, or other type of computing device capable of emitting an electronic signal for reception by the receiver 35. The second identifying information 40, which is transmitted by the transmitting device 45, may include the same type of data provided in the first identifying information 20 associated with the user profile 15 of the first participant 25, in an example. Alternatively, the second identifying information 40 may include only a transmission code that may match or be linked to the unique code associated with the first participant 25, which is part of the first identifying information 20.

When the transmitting device 45 transmits the second identifying information 40 to the receiver 35, the electronic device 5 attempts to match or link the second identifying information 40 with the first identifying information 20 in order to associate the correct user profile 15 with the corresponding first participant 25. In one example, the transmitting device 45 automatically transmits the second identifying information 40 once the first participant 25 enters into the physical conference room and is within a signal reception range of the receiver 35, without requiring any active instructions or actions by the first participant 25. In this regard, the electronic device 5 is able to identify the attendance of the first participant 25 for the conference call 30 automatically upon entry of the first participant 25 into the physical conference room setting. In another example, the first participant 25 may transmit the second identifying information 40 from the transmitting device 45 by actively pressing a button or inputting instructions on the transmitting device 45.

The first identifying information 20 and the second identifying information 40 may be combined, matched, or linked to form an identifier 50 for the first participant 25. This identifier 50 is unique to the first participant 25 and may comprise a visual component including a name, identification, text, picture, image, video, or hologram, among other types of identifiers of the first participant 25.

The electronic device 5 includes an audio encoder 55 to receive an audio signal 60 that is generated during the conference call 30. As the first participant 25 speaks during the conference call 30, the first participant 25 generates an audio signal 60. The audio encoder 55 receives this audio signal 60. Moreover, the audio encoder 55 receives each subsequent audio signal 60 that is generated by the first participant 25.

A processor 65 is provided to perform signal processing of the audio signal 60. In particular, in response to determining which transmitting device 45 is nearest to a source of the audio signal 60 relative to other transmitting devices 45x associated with other local participants, the processor 65 identifies the first participant 25 as a source of the audio signal 60. In this regard, when the first participant 25 speaks or otherwise emits or creates an audio signal 60, the processor 65 attempts to link the audio signal 60 as being associated with the first participant 25. In other words, the processor 65 attempts to identify that the first participant 25 is the source of the audio signal 60 that is being received by the audio encoder 55 as opposed to some other local participant being the source of the audio signal 60. In order to accomplish this, according to an example, the processor 65 identifies the transmitting device 45 that is closest in proximity to the direction or source of the audio signal 60 relative to other transmitting devices 45x that may be located proximate to the transmitting device 45. Once the transmitting device 45 is identified as being the closest in proximity to the detected audio signal 60, the processor 65 associates the first participant 25 who is associated with the transmitting device 45 as the person who is speaking. Accordingly, the second identifying information 40 associated with the transmitting device 45 may be used as a code to link the transmitting device 45 to the first identifying information 20 of the user profile 15 of the first participant 25. This allows the processor 65 to identify who is speaking in the conference call 30 from amongst a group of local participants.

The processor 65 combines the identifier 50 for the first participant 25 with the audio signal 60 generated by the first participant 25. The identifier 50 establishes or otherwise identifies who is speaking and the audio signal 60 provides the audio, noise, sound emitted by the first participant 25. The electronic device 5 also includes a router 70 to forward the combined identifier 50 and audio signal 60 of the first participant 25 to a receiving device 75 of a second participant 26 in the conference call 30. The router 70 may be a separate component in the electronic device 5, in one example. Alternatively, the receiver 35 and router 70 may be a combined transceiver device capable of receiving signals from the transmitting device 45 and transmitting signals to the receiving device 75. The receiving device 75 may include a smart phone, tablet device, laptop, desktop computer, or other type of computing device capable of receiving audio and/or video signals from the receiver 35. The second participant 26 may be a remote or virtual participant in the conference call 30 and may not be physically in the same room as the first participant 25. However, by receiving the combined identifier 50 and audio signal 60 associated with the first participant 25, the second participant 26 is able to identify the source of audio from the conference call 30 even though the second participant 26 is remotely located from the first participant 25, who is the source of the audio.

In an example, the processor 65 authenticates the first participant 25 in the conference call 30 upon matching the first identifying information 20 with the second identifying information 40. This may be used in secured conversations and for enhanced security, in general. In this regard, once the first participant 25 arrives in the conference room where the electronic device 5 is, and the transmitting device 45 sends the second identifying information 40 to the receiver 35, then the processor 65 may authenticate the first participant 25 as being an authorized participant in the conference call 30. If the first participant 25 does not have his/her transmitting device 45 and cannot transmit the second identifying information 40 to the receiver 35, then while the first participant 25 may physically be in the conference room and may be able to partake in the conference call 30, he/she will not be recognized by the electronic device 5 as being an attendee, and as such no identifier 50 will be linked with any audio signal 60 that is emitted by the first participant 25. Other attendees including the second participant 26 will know that a non-authenticated participant is speaking, in such circumstances. In this regard, the electronic device 5 may identify the first participant 25 as a guest, etc. without further identifying information.

FIG. 2, with reference to FIG. 1, is a schematic diagram illustrating an avatar 80 assigned to a conference call participant 25 according to an example. More specifically, the identifier 50 may comprise an avatar 80 associated with the first participant 25. The avatar 80 may be an image, picture, hologram, video, animation, text, or any other type of avatar. FIG. 3, with reference to FIGS. 1 and 2, is a schematic diagram illustrating at least one directional microphone 85 receiving the audio signal 60 according to an example. In an example, the audio encoder 55 may receive the audio signal 60 from an array of directional microphones 85 capturing audio from the first participant 25. Accordingly, if the first participant 25 moves around in the conference room, then the array of directional microphones 85 are able to receive the audio signal 60 accordingly. According to some examples, the array of directional microphones 85 may include one microphone or multiple microphones.

FIG. 4, with reference to FIGS. 1 through 3, is a schematic diagram illustrating identifying information 40 relating to a conference call participant 25 according to an example. Here, the second identifying information 40 comprises location information 90 about the first participant 25. In this regard, the location information 90 may include the geographic location of the first participant 25, which is associated with the physical conference room setting, or if there are multiple physical conference rooms that are linked together in the conference call 30, then the location information 90 associated with the first participant 25 may be used to identify in which specific conference room the first participant 25 is located.

Figure 5:
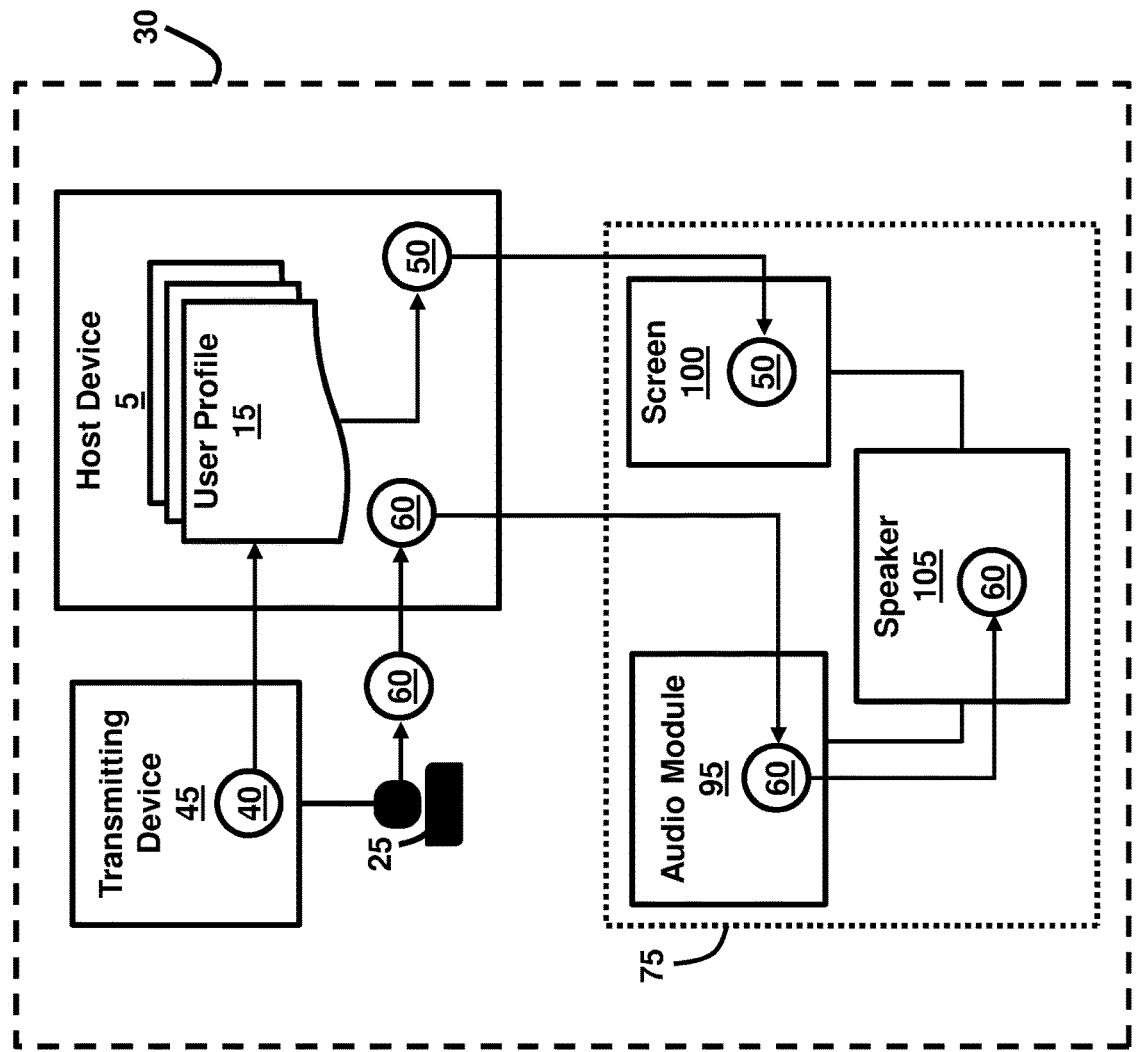
FIG. 5 is a schematic diagram depicting a conference call according to another example.

FIG. 5, with reference to FIGS. 1 through 4, is a schematic diagram depicting a conference call 30 according to another example. As shown in FIG. 5, an electronic device; i.e., receiving device 75, comprises an audio module 95 to receive the audio signal 60 identified by a host device; i.e., electronic device 5, as originating from a participant 25 of a conference call 30. The audio module 95 may receive the audio signal 60 wirelessly or over a wired communications channel. The identification of the audio signal 60 as being originated from the participant 25 comprises matching the pre-programmed user profile 15 of the participant 25 with the identifying information 40 transmitted by the transmitting device 45 that is nearest to the participant 25. This identification of the audio signal 60 as being associated with the participant 25 occurs prior to transmission of the audio signal 60 to the receiving device 75. As indicated above, the identifying information 40 is linked to the user profile 15 in order to create the participant identifier 50. The electronic device; i.e., receiving device 75 comprises a screen 100 to display the participant identifier 50, and a speaker 105 to output the audio signal 60 contemporaneous with the participant identifier 50 being displayed on the screen 100. This permits the second participant 26 to hear the audio being emitted by the first participant 25 and to have an associated identifier 50 being displayed at the same time as the audio that is being transmitted in order to provide an identification of the first participant 25; e.g., to permit the second participant 26 to know exactly who is speaking as it occurs.

Figure 6:
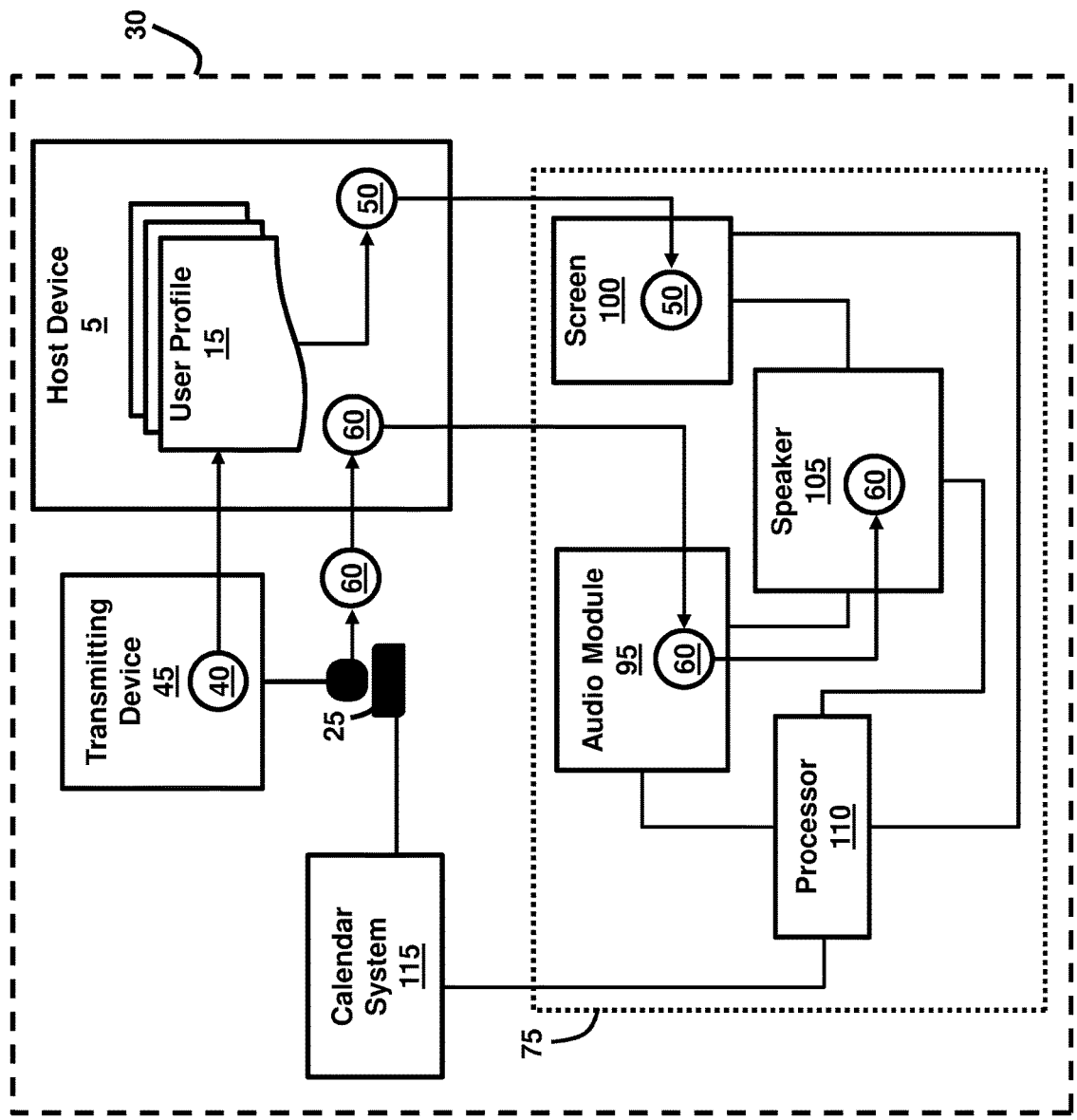
FIG. 6 is a schematic diagram depicting a conference call linked to a calendar system according to an example.

FIG. 6, with reference to FIGS. 1 through 5, is a schematic diagram illustrating a conference call 30 linked to a calendar system 115 according to an example. In particular, the electronic device 5 comprises a processor 110 to link to a computerized calendar system 115, wherein the participant 25 is authenticated based on a preset selection of the participant 25 by the computerized calendar system 115. In an example, the calendar system 115 may comprise an Outlook® or Microsoft Exchange Server® calendar system available from Microsoft Corporation. The participant 25 may preset his/her participation in the conference call 30 through the calendar system 115, and thus the host device; i.e., the electronic device 5, may include the participant 25 in a preselected roster of conference call attendees, and once the physical presence of the participant 25 is authenticated by transmission of the identifying information 40 to the electronic device 5, then the computerized calendar system 115 may be updated to indicate the attendance of the participant 25 in the conference call 30. The preselected roster of conference call attendees associated with the preset participation in the conference call 30, by way of the calendar system 115 communicating with the processor 110, may be presented to and displayed on the screen 100 of the receiving device 75 prior to the commencement of the conference call 30 to permit the second participant 26 to know, in advance, the likely live attendees of the conference call 30. Again, the participant identifier 50 comprises an avatar 80, according to an example, which is displayed on the screen 100 of the receiving device 75.

Figure 7:
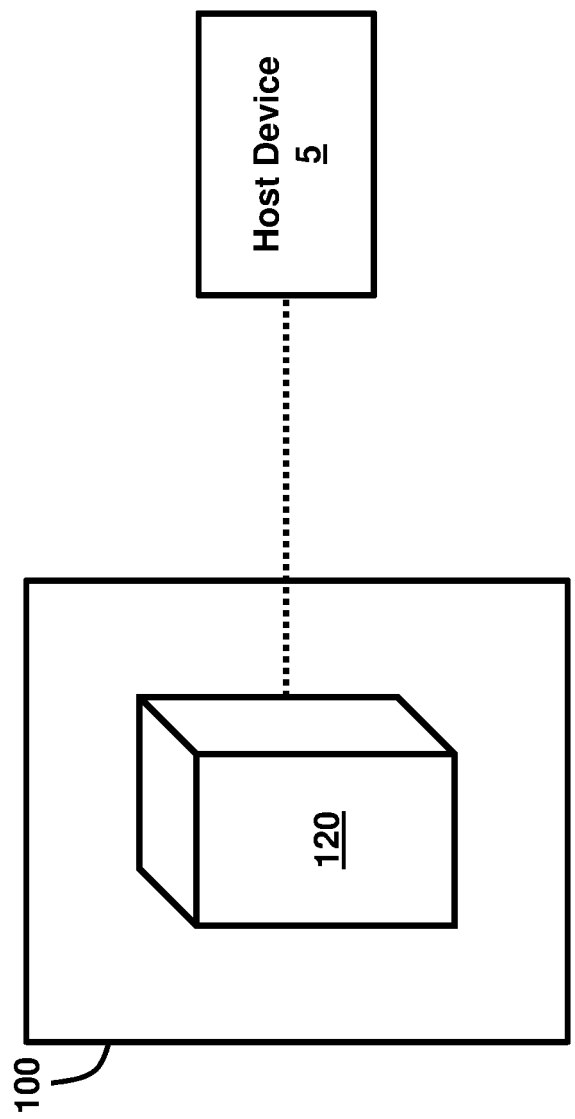
FIG. 7 is a schematic diagram illustrating an avatar of a host device being displayed on a screen according to an example.

FIG. 7, with reference to FIGS. 1 through 6, is a schematic diagram illustrating an avatar 120 of a host device 5 being displayed on a screen 100 according to an example. As such, the screen 100 may display an avatar 120 associated with the host device 5. In this regard, the host device 5 has its own unique avatar 120 apart from the specific avatar 80 associated with participant 25. According to an example, the avatar 120 permits non-authenticated participants located in the live conference call setting to participate in the conference call 30 whereby any audio generated by the non-authenticated participants is transmitted by the host device 5 and is identified as being associated with the host device 5 through the avatar 120 displayed on the screen 100 of the receiving device 75. The audio is also transmitted and to the audio module 95 and output through the speaker 105 of the receiving device 75 contemporaneous with the displaying of the avatar 120 on the screen 100 of the receiving device 75.

Figure 8:
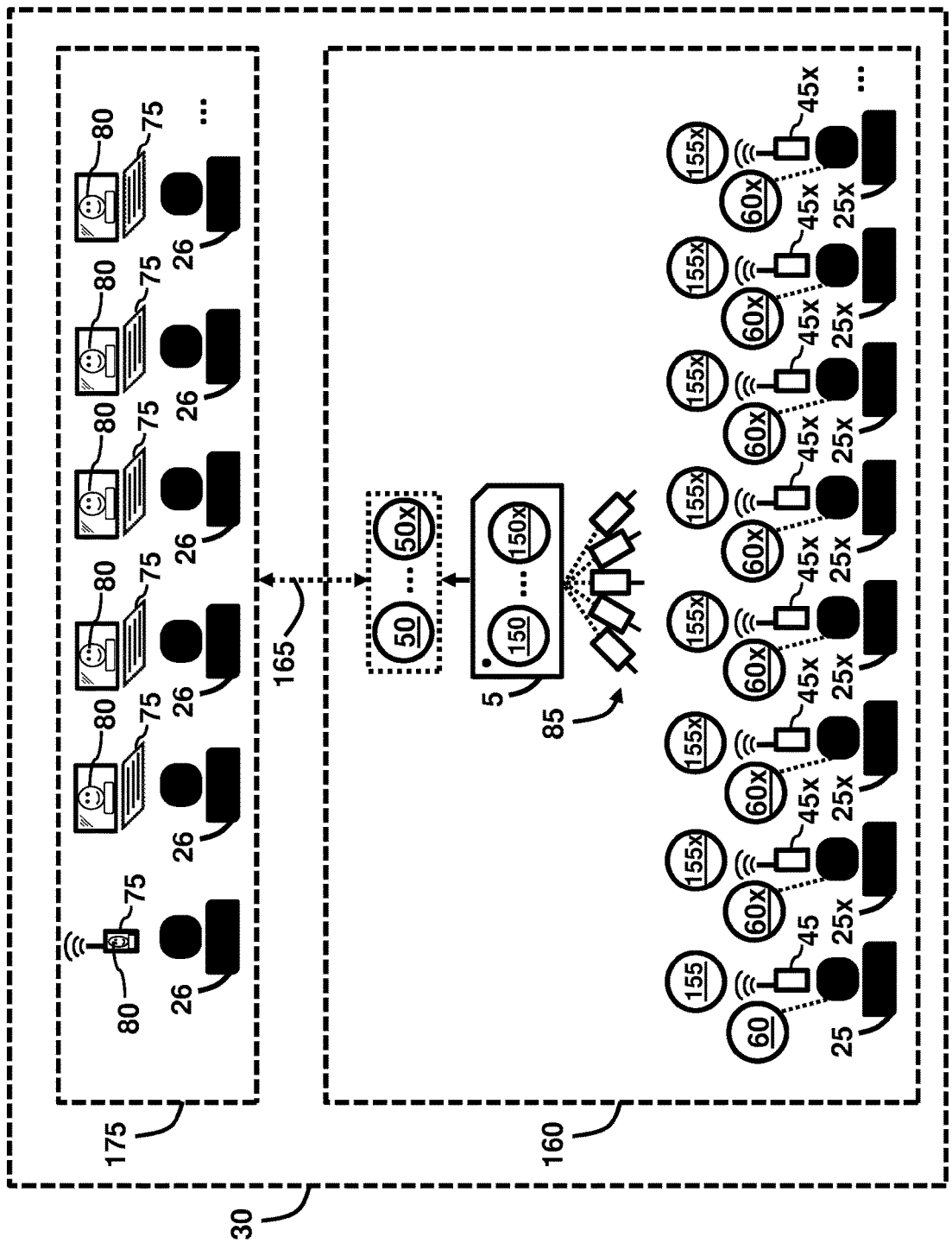
FIG. 8 is a schematic diagram illustrating a conference call with multiple local and remote participants according to an example.

FIG. 8, with reference to FIGS. 1 through 7, is a schematic diagram illustrating a conference call 30 with multiple local 25, 25*x* and remote 26 participants according to an example. In FIG. 8, participants 25, 25*x* are in a local conference call location 160, which may be a physical conference room. The local conference call location 160 comprises a host electronic device 5 comprising a first identification code 150, 150*x* associated with each user profile 15. The first identification code 150, 150*x* may be part of the first identifying information 20 described above. Each participant 25, 25*x* has his/her own transmitting device 45, 45*x*, respectively, that emits a second identification code 155, 155*x*, respectively, such that as each participant 25, 25*x* enters the local conference call location 160, the transmitting device 45, 45*x* transmits the second identification code 155, 155*x* to the host electronic device 5. The second identification code 155, 155*x* may be part of the second identifying information 40 described above. Once the first identification code 150, 150*x* is linked or matched with the second identification code 155, 155*x*, respectively, then the corresponding participants 25, 25*x* are authenticated and recognized by the host electronic device 5 as being an attendee in the conference call 30.

Once a participant 25, for example, speaks, then the array of directional microphones 85 may receive the audio signal 60 and transmit the same to the host electronic device 5. Once this occurs, the host electronic device 5 matches or links the source of the audio signal 60 as being participant 25 based on the transmitting device 45 that is closest in proximity to where the audio signal 60 originates. In this regard, the array of directional microphones 85, which may be one or more microphones arranged in the local conference call location 160, is able to locate the source of the audio signal 60. For example, the array of directional microphones 85 may use signal triangulation techniques to isolate an area from where the audio signal 60 is originating, and using this information the host electronic device 5 selects the transmitting device 45 that is closest in proximity to this originating area of the audio signal 60. Because the transmitting device 45 is constantly transmitting the second identification code 155 during the entire duration of the conference call 30, the host electronic device 5 is constantly matching any audio signal 60 that it receives to the nearest transmitting device 45. The linked first identification code 150 and second identification code 155 create the identifier 50, which is then transmitted through a communications channel 165 to a remote conference call location 175. A similar process occurs for each of the other participants 25*x* and their respective transmitting device 45*x*, identifier 50*x*, audio signal 60*x*, first identification code 150*x*, and second identification code 155*x*.

The remote conference call location 175 includes one or more participants 26 each having his/her own receiving device 75, in one example. In another example, the one or more participants 26 share a receiving device 75. The avatar 80 and audio signal 60 associated with the participant 25 who is speaking in the local conference call location 160 is transmitted to and displayed/output on the receiving device 75 to allow the one or more participants 26 to identify who is speaking in the local conference call location 160. Additionally, avatar 120 may also be displayed on the receiving device 75. In an example, the local conference call location 160 and the remote conference call location 175 are two distinct physical locations. In another example, the remote conference call location 175 may be part of the local conference call location 160. For example, the local conference call location 160 may comprise a large auditorium, room, or may be in an outdoor setting, and the remote conference call location 175 may be one part of the overall local conference call location 160 such that participants 26 in the remote conference call location 175 may need to utilize a receiving device 75 in order to participate in the conference call 30 due to the large expansive size of the local conference call location 160 and perhaps due to the inability of being able to see exactly who is speaking during the conference call 30.

Various examples described herein may include both hardware and software elements. The examples that are implemented in software may include firmware, resident software, microcode, etc. Other examples may comprise a computer program product configured to include a preconfigured set of instructions, which when performed, may result in actions as stated in conjunction with the methods described above. In an example, the preconfigured set of instructions may be stored on a tangible non-transitory computer readable medium or a program storage device containing software code.

Figure 9B:
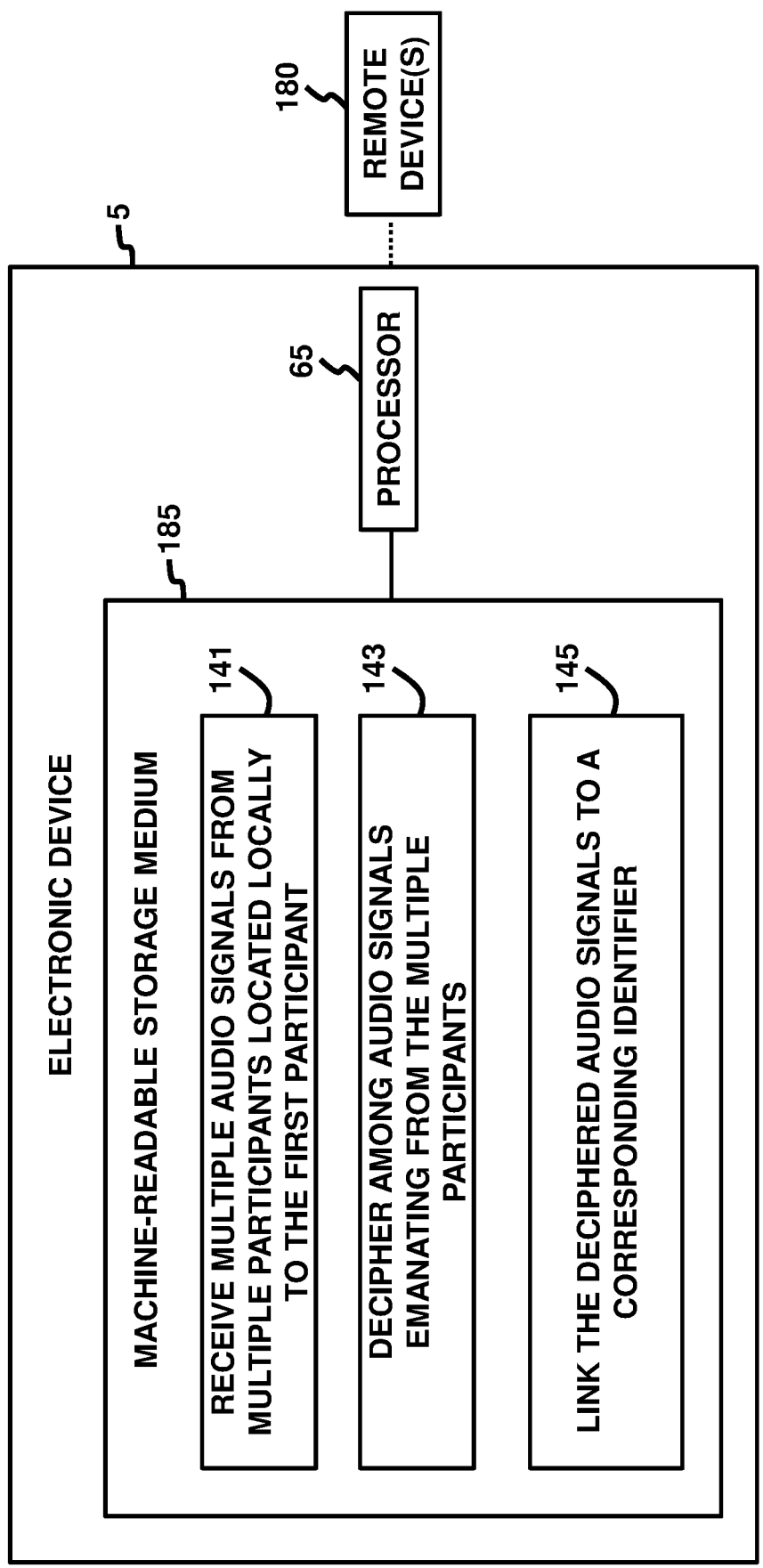
FIG. 9B is a block diagram of an electronic device for deciphering from amongst multiple audio signals in a conference call according to an example.

FIGS. 9A and 9B with reference to FIGS. 1 through 8, are block diagrams of an electronic device 5 for conducting a conference call 30, and deciphering from amongst multiple audio signals in a conference call 30, respectively, according to some examples. The electronic device 5 may be the host electronic device 5 of FIGS. 1 and 5-8, in one example. The electronic device 5 may be any other electronic device with signal processing capability, according to another example. In the example of FIGS. 9A and 9B, the electronic device 5 includes the processor 65 of FIG. 1 and a machine-readable storage medium 185.

Processor 65 may include a central processing unit, microprocessors, and/or other hardware devices suitable for retrieval and execution of instructions stored in machine-readable storage medium 502. Processor 65 may fetch, decode, and execute computer-executable instructions 125, 127, 129, 131, 133, 135, 141, 143, and 145 to enable execution of locally-hosted or remotely-hosted applications for controlling action of the electronic device 5. The remotely-hosted applications may be accessible on one or more remotely-located devices 180, for example. As an alternative or in addition to retrieving and executing instructions, processor 65 may include one or more electronic circuits comprising a number of electronic components for performing the functionality of one or more of instructions 125, 127, 129, 131, 133, 135, 141, 143, and 145.

The machine-readable storage medium 185 may be any electronic, magnetic, optical, or other physical storage device that stores executable instructions. Thus, the machine-readable storage medium 185 may be, for example, Random Access Memory, an Electrically-Erasable Programmable Read-Only Memory, a storage drive, an optical disc, and the like. In one example, the machine-readable storage medium 185 may comprise a non-transitory computer-readable storage medium. The machine-readable storage medium 185 may be encoded with executable instructions for enabling execution of remotely-hosted applications accessed on the one or more remotely-located devices 180.

In an example, the processor 65 of the electronic device 5 executes computer readable instructions. For example, in FIG. 9A, computer-executable generating instructions 125 may generate an identifier 50 corresponding to a user profile 15 comprising a first identification code 150. Computer-executable receiving instructions 127 may receive a second identification code 155, 155x from a transmitting device 45, 45x at a local conference call location 160, wherein the second identification code 155 comprises location information 90 of the transmitting device 45. Computer-executable authenticating instructions 129 may authenticate a first participant 25, 25x in a conference call setting 30 upon matching the first identification code 150 with the second identification code 155. Computer-executable receiving instructions 131 may receive audio signals 60 from the first participant 25. Computer-executable linking instructions 133 may link the audio signals 60 to the identifier 50. Computer-executable transmitting instructions 135 may transmit the identifier 50 and linked audio signals 60 through a communications network 165 to a remote conference call location 175, wherein identification of the first participant 25 is transmitted by the electronic device 5 to remotely-located participants 126 through the identifier 50.

As indicated in FIG. 9B, computer-executable receiving instructions 141 may receive multiple audio signals 60 from multiple participants 25x located locally to the first participant 25. Computer-executable deciphering instructions 143 may decipher among audio signals 60 emanating from the multiple participants 25x. Computer-executable linking instructions 145 may link the deciphered audio signals 60 to a corresponding identifier 50.

According to one example, the computer-executable linking instructions 133 that link the audio signals 60 to the identifier 50 comprises attributing audio signals 60 to the first participant 25 based on a proximity of the transmitting device 45 to a source of the audio signals 60. According to another example, the computer-executable linking instructions 133 that link the audio signals 60 to the identifier 50 comprises utilizing voice recognition software instructions to link the audio signals 60 to the identifier 50. In this regard, the user profile 15 may comprise a voice library or preprogrammed voice recognition modules associated with a participant 25, for example, and when the participant 25 emits an audio signal 60; i.e., speaks, then the electronic device 5 may utilize the voice recognition software to identify which participant 25 is speaking and may create/match the identifier 50 accordingly. In this example, the electronic device 5 may or may not utilize the closest transmitting device 45 technique to identify the participant 25 as the source of the audio signal 60. As described above, the identifier 50 may comprise an avatar 80, and the processor 65 may generate an avatar 120 associated with the electronic device 5, which may represent the local conference call location 160.

The examples described above provide techniques to allow each participant 25, 25x, 26 in a conference call 30 to have a similar experience in terms of identifying who is speaking. As local participants 25, 25x enter a physical conference room; e.g., local conference call location 160, the electronic host device 5 identifies their presence due to the transmission of identifying information 40 or a code 155, 155x from the transmitting device 45, 45x associated with the local participant 25, 25x respectively. In order to decipher from amongst a group of local participants 25, 25x who may speak during the conference call 30 into one host electronic device 5, an audio detection technique identifies which specific participant 25, 25x is speaking at a particular time and creates an identifier 50, 50x associated with the specific participant 25, 25x for transmission to the one or more remote participants 26 in the conference call 30. If a participant 25, 25x is in the local conference call location 160, and did not previously indicate that he/she would be a participant in the conference call 30, then the host electronic device 5 may still detect this participant 25, 25x and may categorize him/her as a guest and display a guest avatar or provide an avatar 120 associated with the host electronic device 5. The preprogrammed voice recognition modules may also help identify this participant 25, 25x to virtual/remote participants 26. As the conference call 30 concludes, and in-room participants 25, 25x leave the local conference call location 160, their respective transmitting devices 45, 45x are no longer detectable by the host electronic device 5, and their avatars 80 and/or participation drops-off the display screen 100 of the receiving device 75 of the remote participant 26.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An electronic device comprising:
   a memory to store a user profile comprising first identifying information of a first participant in a conference call;
   a receiver to receive second identifying information of the first participant from a transmitting device associated with the first participant, wherein the first identifying information and the second identifying information each comprise non-audio data and without containing audio or voice data, and wherein the receiver is to receive the second identifying information automatically when the transmitting device is within signal reception range of the receiver;
   an audio encoder to receive an audio signal generated by the first participant during the conference call;
   a processor to:
      in response to determining which transmitting device is nearest in proximity to a source of the audio signal relative to other transmitting devices, identify the first participant as a source of the audio signal;
      link the first identifying information and the second identifying information to form an identifier for the first participant; and
      combine the identifier for the first participant with the audio signal generated by the first participant;
   a router to forward the combined identifier and audio signal of the first participant to a receiving device of a second participant in the conference call, wherein the combined identifier and audio signal provide an identification of the first participant.

2. The electronic device of claim 1, wherein the processor is to authenticate the first participant in the conference call upon matching the first identifying information with the second identifying information.

3. The electronic device of claim 1, wherein the identifier comprises an avatar.

4. The electronic device of claim 1, wherein the audio encoder is to receive the audio signal from at least one directional microphone capturing audio from the first participant.

5. The electronic device of claim 1, wherein the second identifying information comprises location information about the first participant.

6. An electronic device comprising:
   an audio module to receive an audio signal generated by the first participant during a conference call and identified by a host device as originating from a participant of the conference call, wherein identification of the audio signal being originated from the participant comprises matching a pre-programmed user profile that contains non audio data of the participant with identifying information transmitted by a transmitting device that is nearest in proximity to the participant, wherein the data of the participant and the identifying information comprise non-audio data and without containing audio or voice data, wherein the audio module is to receive the identifying information automatically when the transmitting device is within signal reception range of the audio module, and wherein the identifying information is linked to the user profile to create a participant identifier that provides an identification of the participant;
   a screen to display the participant identifier; and
   a speaker to output the audio signal contemporaneous with the participant identifier being displayed on the screen.

7. The electronic device of claim 6, comprising a processor to link to a computerized calendar system, wherein the participant is authenticated based on a preset selection of the participant by the computerized calendar system.

8. The electronic device of claim 6, wherein the participant identifier comprises an avatar.

9. The electronic device of claim 6, wherein the screen is to display an avatar associated with the host device.

10. A machine-readable storage medium comprising instructions that when executed cause a processor of an electronic device to:
    generate an identifier corresponding to a user profile comprising a first identification code and data comprising non-audio data and without containing audio or voice data;
    receive a second identification code from a transmitting device at a local conference call location, wherein the second identification code comprises location information of the transmitting device, wherein the location information comprises non-audio data and without containing audio or voice data, and wherein the second identifying code is automatically received from the transmitting device when the transmitting device is within signal reception range of the electronic device;
    authenticate a first participant in a conference call setting upon matching the first identification code with the second identification code;
    receive audio signals from the first participant and generated by the first participant during the conference call setting;
    link the audio signals to the identifier; and
    transmit the identifier and linked audio signals through a communications network to a remote conference call location,
    wherein identification of the first participant is transmitted by the electronic device to remotely-located participants through the identifier.

11. The machine-readable storage medium of claim 10, wherein the processor is to:
receive multiple audio signals from multiple participants located locally to the first participant;
decipher among audio signals emanating from the multiple participants; and
link the deciphered audio signals to a corresponding identifier.

12. The machine-readable storage medium of claim 10, wherein the processor is to link the audio signals to the identifier by attributing audio signals to the first participant based on a proximity of the transmitting device to a source of the audio signals.

13. The machine-readable storage medium of claim 10, wherein the processor is to utilize voice recognition software instructions to link the audio signals to the identifier.

14. The machine-readable storage medium of claim 10, wherein the identifier comprises an avatar.

15. The machine-readable storage medium of claim 10, wherein the processor is to generate an avatar associated with the electronic device.

16. The electronic device of claim 1, wherein the first identifying information comprises a name, title, work location, work group, contact details, identification number, picture of the first participant, or a combination thereof.

17. The electronic device of claim 1, wherein the second identifying information comprises a name, title, work location, work group, contact details, identification number, picture of the first participant, or a combination thereof.

18. The electronic device of claim 6, wherein the identifying information comprises a name, title, work location, work group, contact details, identification number, picture of the participant, or a combination thereof.

19. The machine-readable storage medium of claim 10, wherein the first identification code comprises a name, title, work location, work group, contact details, identification number, picture of the first participant, or a combination thereof.

20. The machine-readable storage medium of claim 10, wherein the second identification code comprises a name, title, work location, work group, contact details, identification number, picture of the first participant, or a combination thereof.

* * * * *